Jan. 28, 1930.     C. HAIGH     1,744,888
CLUTCH DISK
Filed Feb. 12, 1927
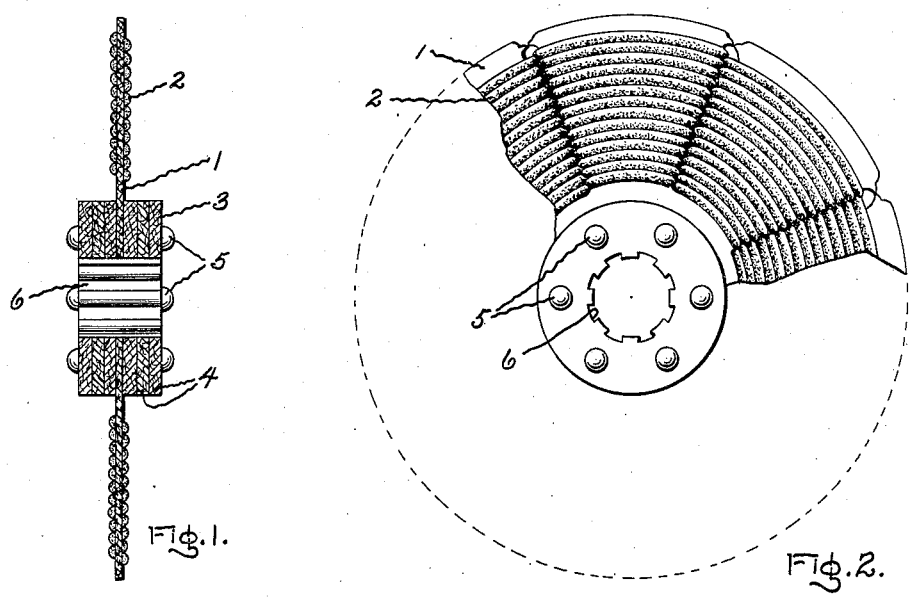
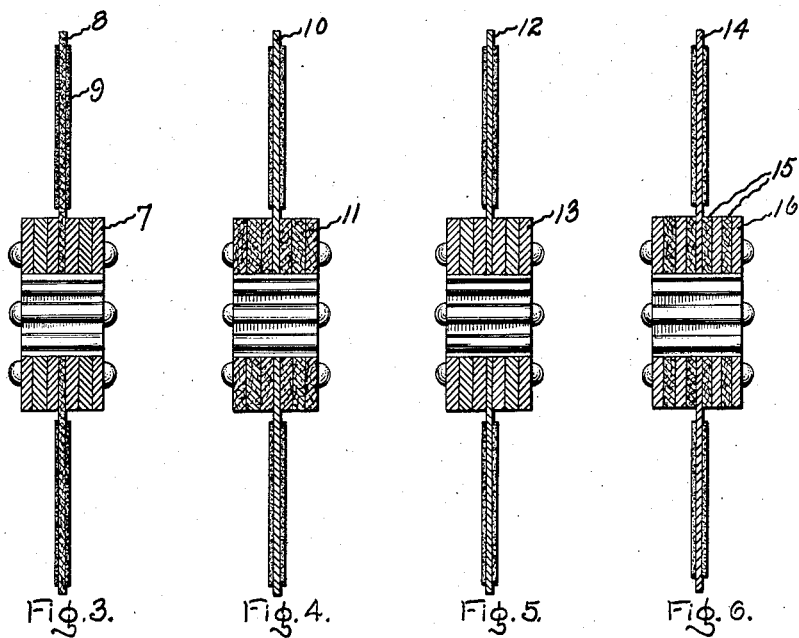
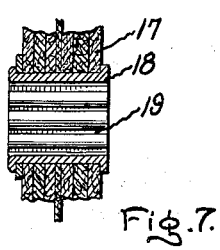
Inventor:
Christopher Haigh,
by Alfred V. Bobst
His Attorney.

Patented Jan. 28, 1930

1,744,888

UNITED STATES PATENT OFFICE

CHRISTOPHER HAIGH, OF WINTHROP, MASSACHUSETTS

CLUTCH DISK

Application filed February 12, 1927. Serial No. 167,840.

The present invention relates to clutch disks such as are used in automobile clutches, for example, and which comprise ordinarily a clutch plate and a hub, the plate and hub being formed as two separate members suitably riveted or bolted together and the peripheral portion of the plate being provided with a suitable facing of friction material.

In connection with the manufacture of clutch disks, (and by the term "clutch disk" I mean a structure comprising a clutch plate and a hub), it has been the usual practice to form the hubs either as a forging or a screw machine part. Both of these methods of manufacture are relatively expensive. Also, if a forging is used, the equipment for making it is costly and if a screw machine part is used, a large investment in screw machines is required, it being necessary to use machines of large size.

One object of my invention is to provide an improved clutch disk whereby I produce a clutch disk equal mechanically to clutch disks now in use but which I am enabled to manufacture at lower cost and with less costly manufacturing equipment.

Again, one of the problems in connection with automobiles is the elimination of noises which are transmitted through the driving gear and clutch into the car body, and a further object of my invention is to provide an improved clutch disk structure which will, to a considerable extent, at least, absorb and dampen out the transmission vibrations which are the primary cause of many objectionable noises, especially in closed cars.

According to my invention, I provide a clutch plate having a central opening of a diameter substantially that desired for the finished clutch disk and I then construct the hub from a number of washers of suitable size and thickness which are fastened to the clutch plate and to each other in a suitable manner such as by being riveted or welded together. The washers may be formed, for example, by stamping them from sheet material of convenient thickness, by cutting them from a bar, or by cutting them from a tube. At some stage of the manufacture, the washers are provided with slots in the material adjacent to their central openings so that when assembled with each other and with the clutch plate there is provided one or more continuous splines in the material at the center of the assembly. This splining operation may be, with advantage, left for the last operation after assembly. Also, during manufacture the washers may be provided with a number of holes to receive rivets for fastening the washers and clutch plate together.

According to another feature of my invention, I construct either the clutch plate or the hub, or both the clutch plate and the hub from non-metallic material such as spinnable textile woven fabric united by an adhesive such as a phenolic condensation product, shellac or the like, or a non-metallic material such as hard rubber, impregnated wood or the like. By this arrangement, I provide a structure whereby the clutch disk has a capacity for absorbing vibrations and hence for deadening sounds.

In the drawing, Fig. 1 is a sectional view of a clutch disk embodying my invention; Fig. 2 is a side view thereof; Figs. 3, 4, 5 and 6 are views similar to Fig. 1 showing modifications, and Fig. 7 is a detail sectional view of a further modification.

Referring to Figs. 1 and 2 of the drawing, 1 indicates a clutch plate having a facing 2 of suitable material. In the present instance, a clutch plate of the type disclosed in the patent to Guay and Guay, No. 1,493,433, granted May 6, 1924 is shown by way of example. The hub is indicated at 3. It comprises a number of washers 4 of convenient thickness attached to clutch plate 1 and to each other by rivets 5. The splines for the structures are indicated at 6. In the construction shown in Figs. 1 and 2 both the clutch plate and the hub are indicated as being made from non-metallic material.

In Fig. 3 there is shown a construction similar to that shown in Figs. 1 and 2 except that the hub 7 is made of metal, the plate 8 being made from non-metallic material. Also, in this modification, the clutch facing 9 is shown as being formed from sheet friction material suitably fastened to the clutch plate.

The modification shown in Fig. 4 is similar to that shown in Fig. 3 except that the clutch plate 10 is formed from metal and the hub 11 is formed from non-metallic material.

In the modification shown in Fig. 5, both the plate 12 and the hub 13 are formed from metal. This Fig. 5 construction does not possess the sound deadening or sound absorbing properties of the other constructions. The construction has the advantage, however, of being capable of manufacture at a low cost and without requiring expensive manufacturing equipment.

Fig. 6 shows a modification wherein the clutch plate 14 is formed of metal and the hub is formed from non-metallic washers 15 and metallic washers 17 arranged alternately.

Fig. 7 shows an arrangement similar to that shown in Fig. 1 wherein the hub 17 formed from non-metallic washers is provided with a metal bushing 18 having splines 19. Bushing 18 may be fastened in position in any suitable manner such as by means of a press fit and the flanged ends shown.

According to the preferred method of manufacture, I provide a clutch plate having a central opening with notches in the material around the opening and with suitably spaced holes to receive the fastening rivets. I then provide washers of suitable and convenient thickness provided with notches for forming the splines and with spaced openings for the rivets. Next I assemble the washers on the clutch plate with the rivet holes in alignment and then rivet them together. After this the splines may be broached.

In accordance with the provisions of the patent statutes, I have described the principle of operation of my invention together with apparatus which I now consider to represent the best embodiments thereof, but I desire to have it understood that the apparatus shown is only illustrative and that the invention may be carried out by other means.

What I claim as new and desire to secure by Letters Patent of the United States, is:—

1. A clutch structure comprising a clutch plate and a hub, said hub being formed from non-metallic material.

2. A clutch structure comprising a clutch plate and a hub, said hub being formed from non-metallic material and being provided with a central metallic bushing having splines in its bore.

In witness whereof, I have hereunto set my hand this 10th day of February, 1927.

CHRISTOPHER HAIGH.